United States Patent [19]

McClintock

[11] Patent Number: 5,234,520
[45] Date of Patent: Aug. 10, 1993

[54] METHOD OF MAKING AN ADHESIVE CONSTRUCTION

[75] Inventor: Jack M. McClintock, Pittsburgh, Pa.
[73] Assignee: Morgan Adhesives Co., Stow, Ohio
[21] Appl. No.: 734,240
[22] Filed: Jul. 22, 1991

Related U.S. Application Data

[63] Continuation of Ser. No. 369,716, Jun. 22, 1989, abandoned, which is a continuation of Ser. No. 28,218, Mar. 20, 1987, Pat. No. 4,857,371.

[51] Int. Cl.⁵ .............................................. B29C 65/76
[52] U.S. Cl. ........................................ 156/218; 156/289; 156/304.1; 156/310
[58] Field of Search ................ 156/218, 247, 289, 295, 156/304.1, 306.3, 306.6, 308.2, 310, 165; 138/128, 156, DIG. 9; 428/36.5, 36.92

[56] References Cited

U.S. PATENT DOCUMENTS

| | | | |
|---|---|---|---|
| 2,717,848 | 9/1955 | Jaye | 138/DIG. 9 |
| 3,191,632 | 6/1965 | Keiding | 138/156 |
| 3,554,835 | 1/1971 | Meyer | 156/289 |
| 3,758,362 | 9/1973 | Brown | 156/310 |
| 3,782,994 | 1/1974 | Doherty | 156/203 |
| 3,877,139 | 4/1975 | Martinez | 156/251 |
| 4,022,248 | 5/1977 | Hepner et al. | 156/310 |
| 4,264,388 | 4/1981 | McClintock | 156/289 |
| 4,576,846 | 3/1986 | Noel | 138/DIG. 9 |
| 4,713,271 | 12/1987 | Searl et al. | 138/156 |
| 4,748,060 | 5/1988 | Fry et al. | 156/304.1 |
| 4,857,371 | 8/1989 | McClintock | 428/36.5 |
| 4,909,883 | 3/1990 | Adell | 156/247 |
| 5,069,969 | 12/1991 | McClintock et al. | 428/365 |

FOREIGN PATENT DOCUMENTS

| | | | |
|---|---|---|---|
| 182722 | 1/1955 | Austria | 138/156 |
| 0107979 | 8/1979 | Japan | 156/310 |
| 1174639 | 12/1969 | United Kingdom | 156/79 |

OTHER PUBLICATIONS

"Gustin Bacon Snap On Pipe Insulation" Bulletin of Gustin Bacon Manufacturing Company, Aug. 1960, pp. 1-8.

*Primary Examiner*—Michael W. Ball
*Assistant Examiner*—Steven D. Maki
*Attorney, Agent, or Firm*—Oldham, Oldham & Wilson Co.

[57] ABSTRACT

This invention supplies an adhesive construction for insulation, preferably pipe insulation, having at least one coat of adhesive on at least a part of a face of the slit with a release member to keep the adhesive from adhering to the second face and a method of making the same article.

5 Claims, 1 Drawing Sheet

METHOD OF MAKING AN ADHESIVE CONSTRUCTION

This application is a continuation of Ser. No. 07/369,716 filed Jun. 22, 1989 now abandoned which is a continuation of Ser. No. 07/28,218 filed Mar. 20, 1987, now U.S. Pat. No. 4,857,371.

TECHNICAL FIELD

This invention relates to a method of making an article having an adhesive construction on at least one face thereof. More particularly, this invention relates to an adhesive construction for pipe insulation and said adhesive construction on the composite article. In one aspect, this invention relates to a foamed, preferably integral skin, containing pipe insulation having a slit and methods of applying adhesive to at least one face and protecting said adhesive until the insulation is installed.

BACKGROUND ART

Fiberglass pipe insulation is sold in extremely large volume throughout the world. In more recent time, molded or extruded rigid or flexible foam pipe insulation has become a factor in the market. This foamed or microcellular pipe insulation may be of polyethylene, polypropylene, vinyl resin, polyurethane, polystyrene and related plastic materials. Usually, the blowing of the plastic is controlled to give a foam having a relatively tough, smooth integral skin which can be painted without being covered with a fabric member.

The following list of my patents indicate the nature of some of the prior art products and how they are made: U.S. Pat. Nos. 4,157,410; 4,264,388; and 4,389,270 relative to fiber glass insulation.

DISCLOSURE OF INVENTION

This invention can be utilized with any of the well known types of pipe insulation such as the molded or extruded foam either rigid or flexible insulation. During fabrication of the foamed insulation, a longitudinal slit may be provided therein whereby the insulation can be slipped over and around a piece of pipe to enclose the pipe within the insulation. In the prior art, the slit is usually covered on the outside of the insulation with a pressure sensitive tape to retain the foamed insulation on the pipe.

In this invention, a coating or layer of adhesive is applied to at least part of a first face of the slit and the adhesive coat is covered or protected by a release strip which has sufficient size to cover the adhesive and desirably provide a hand member whereby the release strip can be easily removed during installation.

BRIEF DESCRIPTION OF THE DRAWINGS

The nature of this invention and its advantages and benefits can be readily seen from the drawings wherein.

BEST MODE FOR CARRYING OUT THE INVENTION

Figure 1:
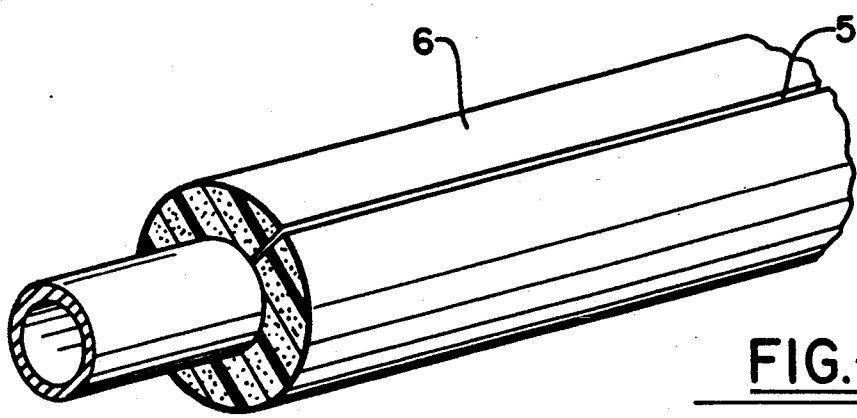
FIG. 1 is a perspective view of the insulation installed on a piece of pipe.
Figure 2:
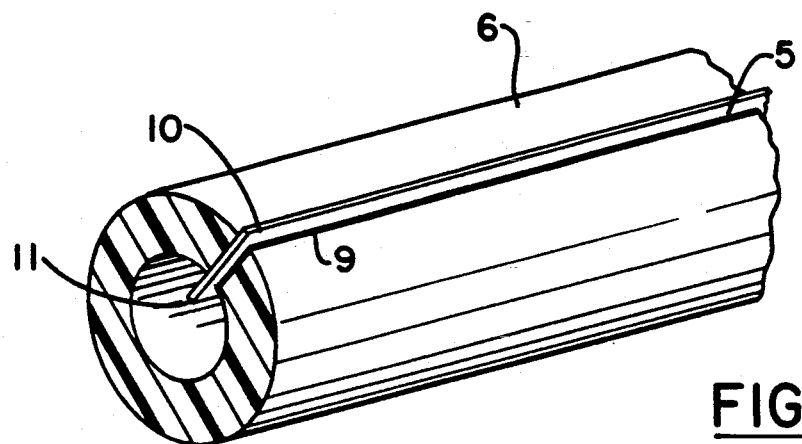
FIG. 2 is a perspective view of one embodiment of this finished pipe insulation having a coating of adhesive on each face and a release member between each coat.
Figure 3:
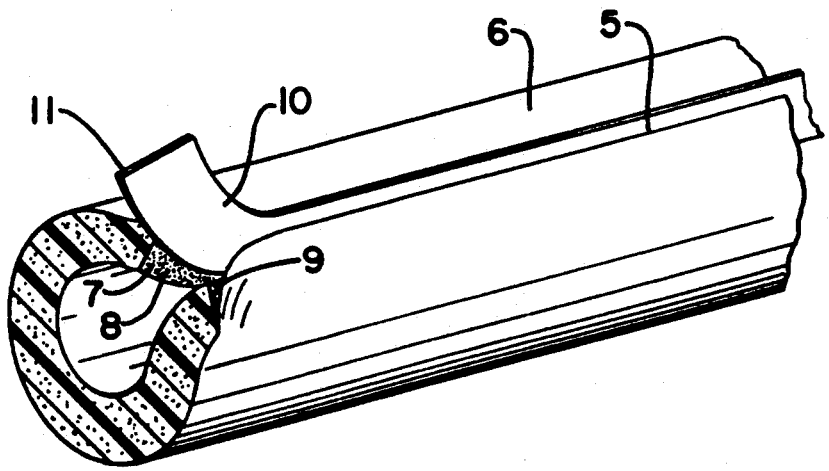
FIG. 3 is a perspective view of another embodiment having an adhesive layer on one face and a shoe horn release member pulled upwardly to open the slit.

Referring specifically to FIGS. 2 and 3, the slit 5 in the insulation unit 6 which may be a porous plastic member or a shaped fiberglass member covered with a fabric is held open by hand or other suitable means and a coat 7 of adhesive is applied to the first face 8 by a brush, swab or other suitable coating means such as spraying. In the embodiment of FIG. 3, the second face 9 is coated, too in the same manner as face 8. Preferably both face 8 and face 9 are coated with pressure sensitive adhesive simultaneously when both faces are to be coated. Then the release strip 10 is placed between the face 8 and the face 9 prior to letting the slit close to bring them into contact with the release strip. The release strip is cut to give it a length preferably greater than the length of a unit of the insulation, usually a length about 0.3 to about 1 centimeter greater than the length of the unit of insulation is sufficient to provide the hand member 11 whereby the workman can grasp the hand member to pull the slit open and remove the release strip during installation. However, it should be understood that the strip 10 may be the same length as the unit of insulation.

It should be appreciated that the release strip may be placed in the slit first and then the adhesive can be applied to the first face by holding the release strip against or close to the second face. Also, the adhesive coating and positioning of the release strip may occur without sequence to which is first but application of the adhesive first is a preferred method.

It should be appreciated that in the most preferred method the release member may be coated on at least one side with an adhesive and preferably on both sides before being placed between the faces of the slit. With the adhesive on the release member, the two faces need to be spread apart and the release member placed between said faces, and a face brought in to contact with the adhesive to retain the release member between the two faces until it is removed to leave the adhesive adhered on said face.

It has been observed that spreading the face tends to cause a degree of relaxation in some foamed insulation. Consequently, it is desirable that the release members have adhesive on both sides to counteract the tendency of the foam to relax, and that there be a tight release between the adhesive and the release member thus holding the faces together until it is desired to remove the release member when positioning the insulation over the pipe.

The adhesive may be any of those well known to the insulation art including those available as a release member with adhesive thereon. Specific and representative types are water emulsions and solvent solutions of elastomers and resins, i.e. two part systems.

The adhesive generally is applied in varying thickness ranging from about 0.5 mil to about 4 mils, with a desirable thickness being 1 to 2 mils and the preferred thickness is about 1.5 mils, depending on the nature of the insulation. Of course, larger thickness can always be used but tend to be less economical as well as time consuming at times. Common or conventional adhesives, preferably of the pressure sensitive type well known to those skilled in the art, may be utilized such as an adhesive containing an acrylic base which may be formulated to any specific purpose that may contain flame retardants and like additives. Another common class is that of the elastomer-based adhesives or the hot melt adhesives. These may be formulated for specific purposes, i.e., usual specific plastics by adding dyes, antioxidants and related adhesive additives or solvents. Specific examples of rubber-based pressure adhesives are blends of styrenebutadiene rubber, polyisoprene and related dienes or olefin polymers, with suitable tackifiers such as those commercially available as used in various grades of cements. The adhesive is applied by any of the conventional means of applying adhesives such as coating, doctoring or brushing.

Generally, any conventional release coat may be utilized such as a silicone coat. The release strip may vary in thickness from about 0.5 to 5 or 6 mils or more, with the cost being usually a controlling factor as well as flexibility. A desirable thickness, in most instances, is 1 to 4 mils and preferably 2 to 3 mils depending on use. The release coat is applied to a carrier strip such as Kraft paper, polyethylene-coated paper or film, polyester film, polyvinyl resin film, polypropylene film, and the like. The release agent can be coated on the carrier strip by any of the well known ways such as by roll coating or Rotogravure printing. Preferrably the carrier strip has sufficient strength to facilitate spreading of the faces as the release member is removed.

In some specific embodiments, the release member may have a double thickness to aid in spreading the faces of the slit away from each other when removed. Kraft paper or polyethylene film maybe used to form the release and may be coated on one side thereof but in another embodiment a second release coat may be on the other side thereof where both faces 8 and 9 have adhesive thereon. It should be noted that the release member may be a single member or it could be doubled over on itself. It is desirable that the release member be stiff to facilate opening the faces.

The cover member for the insulation unit, particularly the fiberglass one, can be made of any of the well known materials such as Kraft paper, or plastic materials such as polyvinylchloride, polyethylene, nylon, polyurethane, either as films, paper, fabric or as laminates to metallic films to enhance liquid and vapor barrier protection. A Particularly preferred one is the commercial material known as ASJ. Cover members are not generally used with foam insulation.

While in accordance with the patent statutes only the best mode and preferred embodiment of the invention has been illustrated and described in detail, it is to be understood that the invention is not limited thereto or thereby, but that the scope of the invention is defined by the appended claims.

What is claimed is:

1. A method of making an adhesive construction comprising providing a tubular insulating covering for a pipe having a first face and a second face wherein the first face and second face form a single slit in the covering and fit in contact with each other, unless spread apart, applying an adhesive to the first face or the second face of the covering, positioning a single release member in the slit to keep said first face from adhering to the second face until the release member is removed, and closing the slit by bringing the first and second face of the covering into contact with the release member to form the adhesive construction wherein said release member has sufficient strength to be pulled from between the first face and second face of the covering to allow the first face of the covering to adhere to the second face of the covering and to allow the covering to enclose said pipe, and further wherein the release member is sufficiently stiff to effect spreading of the first face away from the second face so as to facilitate positioning of said pipe within the covering.

2. The method of claim 1 wherein the adhesive on each face is different and forms an adhesive bond with each other.

3. The method of claim 1 wherein the release member extends beyond the slit to provide a means that can be grasped by a person to remove the release member.

4. A method according to claim 1 where the release member has a double thickness to achieve the desired stiffness to facilitate spreading of the faces away from each other.

5. A method according to claim 1 wherein the adhesive is applied to both the first face and the second face, and the release member has a release coating on both sides thereof.

* * * * *